UNITED STATES PATENT OFFICE.

KURT DESAMARI, OF ELBERFELD, AND ARTHUR ZART, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

MONOAZO DYE.

1,058,562.  Specification of Letters Patent.  Patented Apr. 8, 1913.

No Drawing.  Application filed July 27, 1911. Serial No. 640,781.

*To all whom it may concern:*

Be it known that we, KURT DESAMARI and ARTHUR ZART, doctors of philosophy, chemists, citizens of the German Empire, residing, respectively, at Elberfeld and Vohwinkel, near Elberfeld, Germany, have invented new and useful Improvements in Monoazo Dye, of which the following is a specification.

The present invention relates to the manufacture and production of new azo-coloring matters having most probably the following general formula:

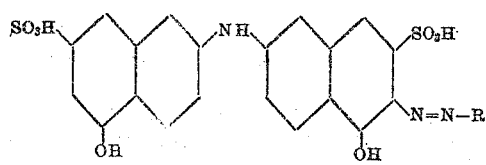

R meaning a derivative of the 2-amino-5-naphthol-7-sulfonic acid containing a heteronuclear ring:

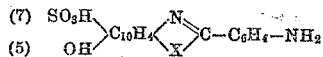

X meaning —NH—, which may be replaced by —O—, and —S— these elements or group of elements being radicals of a divalent nature and forming in the above formula with the other elements the beta-monazole-nucleus.

The new dyes are obtained by combining the diazo compounds prepared from amino-phenyl-5-oxy-2-naphthimidazole-7-sulfonic acids:

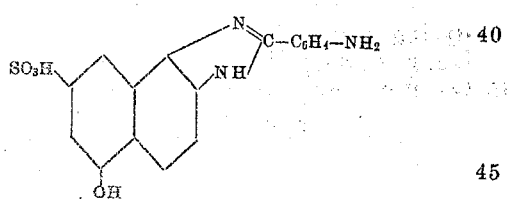

aminophenyl-5-oxy-2-naphthoxazole-7-sulfonic acids:

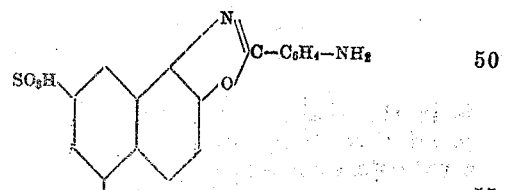

aminophenyl-5-oxy-2-naphthothiazole-7-sulfonic acids:

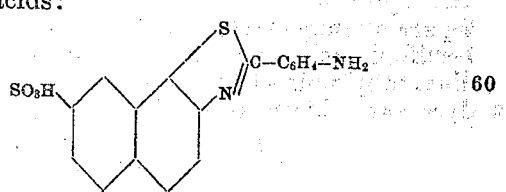

with the 5.5'-dioxy-2.2'-dinaphthylamin-7.7'-disulfonic acid:

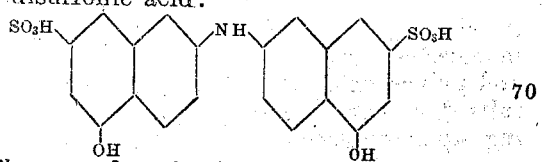

The new dyes having most probably the formula:

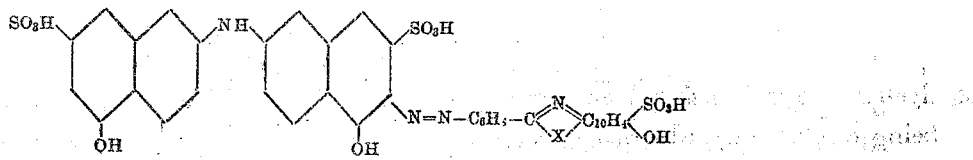

are after being dried and pulverized in the shape of their alkalin salts dark powders soluble in water; yielding upon reduction with stannous chlorid and hydrochloric acid powder soluble in concentrated sulfuric acid with a blue coloration; yielding upon reduction with stannous chlorid and hydrochloric acid para-aminophenyl-5-oxy-1.2-naphthoxazole-7-sulfonic acid and 5.5'-dioxy-6-amino-2.2'-dinaphthylamin-7.7'-disulfonic acid; dyeing cotton bluish red, which shade after being developed with diazotized para-nitranilin is violet fast to washing which can be discharged to a pure white, substantially as described.

In testimony whereof we have hereunto set our hands in the presence of two subscribing witnesses.

KURT DESAMARI. [L. S.]
ARTHUR ZART. [L. S.]

Witnesses:
ALBERT F. NUFER,
LOTTE LUSKMANN.